April 23, 1963     J. D. SORLEY ETAL     3,086,389
SEDIMENT TESTING DEVICE
Filed Sept. 20, 1960

INVENTORS.
JAMES D. SORLEY &
WILLIAM C. LIST
BY
*J. William Freeman*
ATTORNEY

United States Patent Office 3,086,389
Patented Apr. 23, 1963

3,086,389
SEDIMENT TESTING DEVICE
James D. Sorley, 1469 2nd St., and William C. List, 270 W. Steels Corner Road, both of Cuyahoga Falls, Ohio
Filed Sept. 20, 1960, Ser. No. 57,319
5 Claims. (Cl. 73—61)

This invention relates to the art of sediment testing equipment and, in particular, has reference to sediment testing devices used in connection with equipment for the transmitting of bulk milk.

In the copending application of James D. Sorley and William C. List, Serial Number 857,781, filed December 7, 1959, there was disclosed a sediment testing device of this general character wherein milk, stored in a bulk tank, was subjected to test for sediment content prior to its entry into the bulk storage tank of the milk pickup truck.

While the device of the aforementioned copending application has performed with satisfactory utility, it has been found that the same is nonetheless possessed of certain inherent disadvantages.

First, it should be noted that the sediment pad of the aforementioned copending application was shiftably carried by the testing device per se so as to be swingable into and out of position in the path of flow of milk being tested for sediment content.

While apparatus of this type performs satisfactorily, the fact remains that the actuation of the pad into testing position requires an extra operation, and it has oftentimes been found that the step will either be only partially performed, or, in some cases, omitted by the truck driver with the result that the utility of the device is diminished.

Secondly, it has been found that for ideal testing of sediment content, it is desirable that the milk be heated to a temperature above normal storage temperature. The testing of milk at lower temperatures than this oftentime results in inaccurate results.

As a third disadvantage, while the device of the aforementioned copending application made provision for the release of air entrapped within the storage chamber during filling of the same, such mechanism again required manual operation and was not automatic in nature.

It has been discovered that the aforementioned disadvantages can be obviated by providing a sediment testing device having fewer numbers of component parts with such parts being arranged to direct or control the path of fluid flow so that fluid may flow, in effect, into the reservoir through one passage, while being emitted therefrom through another separate and distinct passage. In this fashion, the sediment pad, for example, can be positioned in one of the passages so that such unidirectional flow will cause the sediment to be deposited on the sediment pad during evacuation of the storage reservoir.

Additionally, it has been found that the value of the device is enhanced if the sediment pad was made more readily accessible to the operator of the unit. For this reason, the improved sediment testing device contemplates a separable testing apparatus requiring a minimum of effort for the purposes of pad insertion and removal.

It has been further discovered that the use of such a separate type of arrangement facilitates the optional use of a heating core element that will be conveniently positioned so as to apply heat to the milk during the time that the sediment content thereof is being tested.

It has also been discovered that improved and automatic means can be provided for the purpose of permitting evacuation of the air during filling of the reservoir by merely employing a buoyant object that will float in the milk, and by further contouring certain localized regions of the internal surface of the reservoir in such a fashion that the same will automatically position the float member in covering relationship to an opening in the reservoir upon filling of the same.

Production of an improved sediment testing device having the above mentioned advantages accordingly becomes the principal object of this invention, with other objects thereof becoming more apparent upon a reading of the following brief specification, considered and interpreted in the light of the accompanying drawings:

Figure 2:
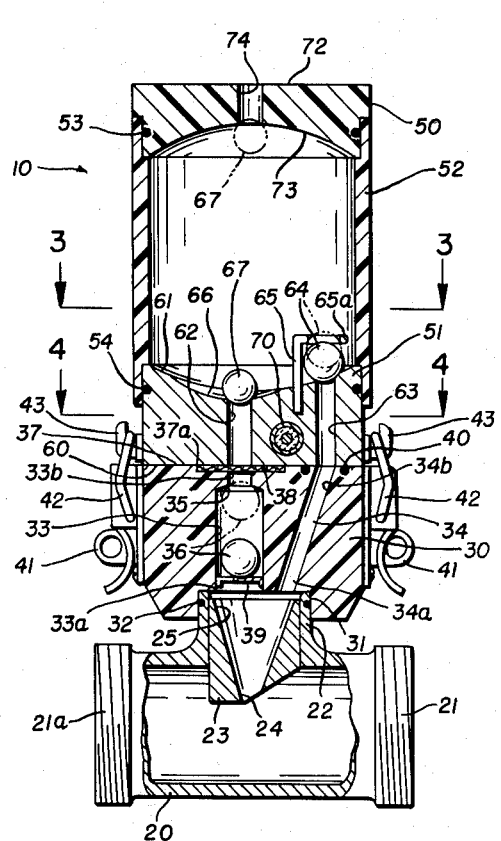
FIGURE 2 is a vertical section through the sediment testing device per se, and being illustrated in enlarged view with respect to FIGURE 1.
Figure 3:
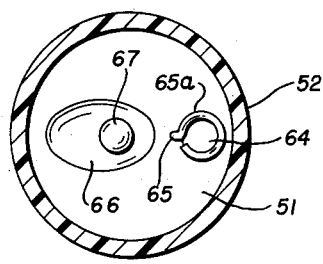
Figure 4:
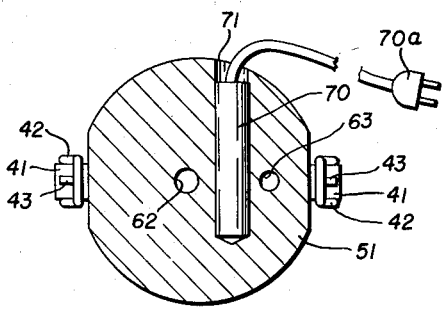

FIGURE 3 and 4 are horizontal sections taken on the lines 3—3 and 4—4 of FIGURE 2.

Figure 1:
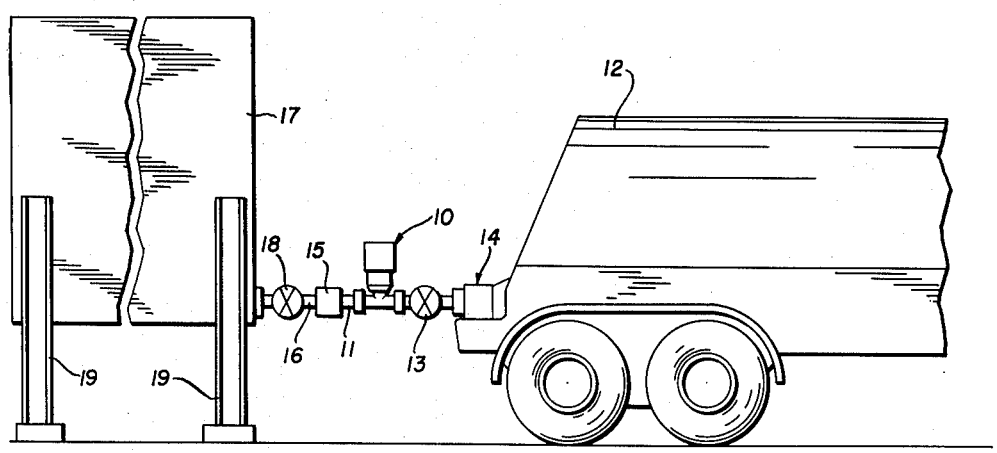
FIGURE 1 is a schematic elevational view, showing the improved sediment testing means interconnected between the bulk storage tank and the milk hauling truck.

Referring now to the drawings and, in particular, to FIGURE 1 thereof, the improved sediment testing means, generally designated by the numeral 10, are shown connected to the intake line 11 of a milk hauling truck 12, with a valve 13 being interposed in the line 11 to control flow therethrough, and with the usual suction pump 14 being provided on the truck 12 for the purpose of drawing milk through the line 11 towards the interior of the truck. The free end of the line 11 connects through coupler 15 with an outlet pipe 16 of the bulk storage tank 17, and again a valve 18 is provided for the purpose of controlling the emission of milk from the interior of the tank 17.

Additionally, an agitator (not shown) is associated with the tank 17 for compliance with the usual requirements in the dairy industry. The tank 17 is further shown elevated on supports 19—19 for sanitation and leveling purposes.

Referring now to FIGURE 2 of the drawings, the improved sediment testing device 10 is shown including an adaptor fitting 20 that is preferably of generally circular configuration, and which has its opposed axial ends threaded, as at 21 and 21a, for the purpose of being threaded into position in the line 11. A T flange 22 opens radially of the adaptor 20 and receives therein a venturi element 23 that has the usual small diameter opening 24 that flares outwardly to the maximum diameter opening 25. In this fashion, a funnel shaped opening is defined by the venturi member 23.

The sediment testing unit 10 further includes a base fitting 30 that is provided with a circular bore 31 at one axial end thereof, with the circular bore 31 being of an appropriate diameter so as to be telescopically engaged over the T flange 22, with the usual O-ring 32 being positioned between these component parts, as clearly shown in FIGURE 2. In addition, the preferred form of the invention shows the base fitting 30 as being of generally cylindrical configuration with the same further including axially extending passages 33a and 34a in aligned registry with the mouth opening 25 of the venturi member 23 when the component parts are assembled, as shown in FIGURE 2.

The passage 33 is further provided with a reduced diameter portion 33b so as to define a shoulder 35 against which a buoyant ball 36 may seat upon movement of the milk towards the reservoir, as will be described.

Additionally, the uppermost end wall 37 of the base fitting 30 is under cut, as at 37a, to provide a recess opening for the sediment pad 38. A spider flange 39 is further shown as being press-fit into the lower end of passage 33 for the purpose of supporting the ball 36 during periods of non-buoyancy.

With reference to the construction of the passage 34, it will be noted that the same is preferably slightly inclined with respect to the axis of the base fitting 30, with end 34b thereof opening into the end surface 37, and with O-ring 40 again being provided for the purpose of providing a seal at this point.

To permit releasable attachment of the component members, hinge members 41, 41 are provided on the base fitting 30 and include swingable hook arms 42, 42 that are engaged over lugs 43, 43 of the reservoir member so as to effect releasable interconnection of these components.

Turning next to a consideration of the reservoir portion of the sediment testing device, it will be seen that in fact the reservoir is made up of upper and lower end wall members 50 and 51, with the same being concentrically aligned with each other and the base fitting 30, and with the same further being interconnected by a tubular sleeve 52, with the usual O-rings 53 and 54 being provided at the points of interconnection between these just described component parts.

Considering first the detailed structure of the lower end wall unit 51, it will be seen that the same has an end surface 60 that abuts the end surface 37 in coplanar relationship therewith during attachment of the components as shown in FIGURE 2, while the opposed face thereof is concaved, as at 61, for the purpose of collecting milk for drainage purposes. Axially extending passages 62 and 63 are respectively aligned with the passages 33 and 34 and in this fashion, a direct communication is provided between line 11 and the interior of the reservoir.

The passage 63 is normally closed to the flow of fluid from the reservoir by the use of a metal ball 64 that is retained in captive adjacency to the end of passage 63 by a post 65, having a circular end 65a (see FIGURE 3). In this fashion the movement of the ball 64 is limited to the movement between the full end chain dotted line positions of FIGURE 2.

Additionally, and again as best shown in plan in FIGURE 3, the surface 61 is preferably further concaved in a localized region, such as 66, for the purpose of directing the buoyant ball 67 into covering relationship with the open end of passage 62, with this position of component parts being best illustrated in FIGURE 2 of the drawings.

For the purpose of heating milk prior to the testing of the sediment content thereof, a heating element 70 is shown positioned in a bore 71 of the lower end wall unit 51, with the heating element 70 being illustrated as being of the core type and being positioned in parallelism with the axial end 60 of the member 51.

Considering next the upper end wall member 50, it will be noted that the same is provided with a wall end 72 and an opposed concaved end wall 73 with passage 74 interconnecting these just described surfaces as clearly shown in FIGURE 2.

For the purpose of connecting with the tubular sleeve 52, both end wall members 50 and 51 are notched for under cut reception with respect to sleeve 52.

In use or operation of the improved sediment testing device, it will first be assumed that the component parts have been positioned as shown in FIGURE 1, with the sediment testing device 10 being positioned in line 11, and with line 11 being connected to line 16 through the medium of coupling 15.

At this time, and before permitting flow of milk into the truck 11, the valve 13 will be closed and at this point the valve 18 can be opened to permit milk to drain from the tank 17. Milk so drained will seek its own level and will, accordingly, seek to move upwardly in the sediment testing device 10. As a result of this upward flow of milk, the buoyant ball 36 will be floated upwardly to the chain dotted line position of FIGURE 2 and thus, milk will be unable to move through the passage 62.

Accordingly, the milk flowing upwardly will be diverted through the aligned passages 34 and 63 and the upwardly moving force thereof will unseat the metal ball 64 and raise the same to the chain dotted line position of FIGURE 2. It has been assumed that prior to the just described movements that the plug 70a of the heating element 70 has been connected to a source of electrical energy so that fluid flowing through the passage 63 will be heated.

With the ball 64 unseated as just described, milk will enter into the reservoir defined by the sleeve 52 and end wall members 50 and 51, and as the level of milk within the reservoir raises, the buoyant ball 67 will also unseat with respect to the upper end of passage 62.

At this time, it might be thought that the milk so entering the reservoir would immediately drain through the passage 62, but this will not be the case since the back pressure acting upwardly against the ball 36 will be greater than the pressure exerted by the milk captured in the reservoir. As the reservoir approaches being filled, entrapped air will be evacuated through aperture 74 until the buoyant ball 67 engages the concave surface 73 and is directed into covering relationship with respect to the aperture 74 at which time the reservoir is closed.

At this time, the valve 18 may be closed and the valve 13 opened, followed by operation of the suction pump 14. This will cause unseating of the ball member 36 and will cause ball 64 to seal so as to respectively (1) open the passage 62 and (2) close the passage 63. During such initial application of vacuum pressure, it must be remembered that the ball 67 will be floating in the upper end of the reservoir so that the same will not interfere with the flow of milk into the passage 62.

Milk so flowing through the passage 62 will automatically pass through the positioned pad 38 and will move downwardly into passage 33 whereupon the same will flow around ball 36 and spider 39 for entry into the venturi member 23. Milk so emitting will ultimately be drawn towards the interior of the truck 12 until the contents of the unit are evacuated.

At this time the hinges 41, 41 may be released and the reservoir unit disconnected, followed by removal of the pad.

If inspection proves the sediment content of the thus tested milk to be satisfactory, then, and in that event, the reservoir unit may be replaced and retained in position by the hinges 41, 41. At such time, the valve 18 may be reopened and the contents of tank 17 transferred to the interior of truck 12.

It will be seen from the foregoing that there has been provided a new and improved type of sediment testing device that is characterized by the fact that the sediment content of stored milk can be accurately and completely tested with minimal difficulties prior to transfer of the same to the bulk storage tank.

It has been shown how the use of a separate inlet and outlet passage that are alternately opened and closed provides an efficient, full-proof and automatic operation with minimal difficulties on the part of the operator.

It has further been shown how the use of heating means aids in enhancing the accuracy of the testing procedure and further how the use of improved air relieving means provides an even further automatic operation to the entire device.

While a full and complete disclosure of the invention has been set forth in accordance with the dictates of the patent statutes, it is to be understood that the invention is not intended to be limited to the specific embodiment herein recited.

Accordingly, modifications of the invention may be resorted to without departing from the spirit hereof or the scope of the appended claims.

This application is a continuation in part of copending application Serial Number 857,781, filed December 7, 1959.

What is claimed is:

1. A sediment collecting device for use with the intake line of a storage tank, comprising an adaptor fitting received in said line and providing communication between the interior and exterior surfaces thereof; a fluid reservoir; first and second fluid supply passages each interconnecting said fluid reservoir with said adaptor fitting; means for limiting the flow through each said passage to unidirectional flow whereby one said passage may serve as inlet passage for said reservoir while the remaining passage may serve as an exhaust passage for said reservoir; sediment collecting means interposed in at least one said passage whereby sediment in fluid passing through said passage will be collected on said sediment collecting means; and heating means disposed adjacent at least one of said fluid supply passages said heating means heating fluid passing through said passage.

2. The device of claim 1 further characterized by the fact that said fluid is heated during entry thereof into said reservoir.

3. A sediment collecting device for use with the intake line of a storage tank, comprising; an adaptor fitting received in said intake line and having a passage therein that provides communication between the interior and exterior surfaces thereof; a base fitting secured to said adaptor fitting and having first and second fluid passages that each have one end thereof in registry with said passage of said adaptor unit; a reservoir including an end member releasably mounted on said base fitting and having first and second fluid passages that respectively connect said first and second passages of said base fitting with the interior of said reservoir; first control means restricting flow in said first passages of said base fitting and said reservoir to unidirectional flow towards said reservoir; second control means restricting flow in said second passages of said base fitting and said reservoir to unidirectional flow away from said reservoir; sediment collecting means interposed between the adjoining ends of said second passages of said base fitting and said reservoir; heating means carried by said end member of said reservoir said heating means heating fluid entering said reservoir.

4. The device of claim 3 further characterized by the fact that said reservoir has the uppermost vertical surface thereof apertured whereby air may be evacuated from the interior thereof during filling.

5. The device of claim 4 further characterized by the presence of a float element received interiorly of said reservoir, and means for directing said float element into registry with said aperture upon filling of said reservoir.

References Cited in the file of this patent

UNITED STATES PATENTS

| | | |
|---|---|---|
| 1,862,311 | Kling | June 7, 1932 |
| 1,918,980 | Nugent | July 18, 1933 |
| 2,026,137 | Moor | Dec. 31, 1935 |
| 2,034,795 | Carkhuff | Mar. 24, 1936 |
| 2,099,038 | Shikles | Nov. 16, 1937 |
| 2,661,847 | Buettner | Dec. 8, 1953 |

FOREIGN PATENTS

| | | |
|---|---|---|
| 191,079 | Great Britain | Nov. 15, 1923 |
| 560,543 | Canada | July 22, 1958 |